United States Patent Office 3,035,901
Patented May 22, 1962

3,035,901
PURIFICATION OF GRAPHITE WITH CHLORINATED HYDROCARBONS
Bushnell Best, Ransomville, N.Y., assignor to Great Lakes Carbon Corporation, New York, N.Y., a corporation of Delaware
No Drawing. Filed Apr. 2, 1959, Ser. No. 803,581
8 Claims. (Cl. 23—209.9)

This invention relates to a method for removing impurities from graphite and more particularly to a method for removing impurities from graphite articles by treatment with a specific type or classification of chlorinated hydrocarbons at an elevated temperature. This process is particularly applicable to the purification of graphite anodes used in electrolytic cells.

Graphite anodes used in caustic-chlorine electrolytic cells, and particularly cells of the so-called mercury type, must be relatively pure in respect to certain trace elements, particularly vanadium and others including chromium, molybdenum and tantalum. These elements, even in minute quantities in a cell in which sodium chloride is electrolyzed for the manufacture of chlorine and caustic, will cause an increase in hydrogen gas being produced. In some systems, for example in mercury cell electrolysis of sodium chloride the brine solution is recycled while in others it is not. In the recycled system, the concentrations of these objectionable metal impurities tend to build up in the brine with time. Therefore, the graphite anodes used in such cells must be relatively pure in order to operate for long periods of time before the hydrogen content becomes excessive. When the hydrogen concentration increases to 2% or greater, an explosive condition is reached making further operations hazardous.

The above-mentioned elements find their way into the finished graphite anode via the raw materials used in their manufacture, i.e. petroleum coke and coal tar pitch binder. A portion of these impurities is volatilized when the graphite anode is graphitized, but often such anodes are unacceptable because they contain as much as 50 p.p.m. (parts per million) of vanadium and many consumers of graphite anodes for mercury cells will not accept products containing over 10 p.p.m. of vanadium.

There are several known methods for purifying graphite by the use of halogens and halogenated compounds. However, all of these processes use a gaseous or relatively volatile liquid reagent which is introduced into a high temperature furnace containing the specimens to be purified at a temperature usually above 500° C. Such methods involve expensive and complicated procedures, and good diffusion of the reagent, particularly into large graphite sections, is not realized. An apparatus for accomplishing such a previously known method is disclosed in French Patent 1,135,459, published April 29, 1957. A complex and rather fragile arrangement of gas-conducting manifolds and porous tubes is required to distribute the purifying gases through the packed furnace. At best, the apparatus does not insure uniform gas distribution around the graphite bodies. Furthermore, such methods are of doubtful utility when treating large, massive pieces of graphite because the purifying gases diffuse only with difficulty, and occasionally not at all, into the interior of such pieces. Also, such methods are very wasteful of reagent.

I have found that large artificial graphite bodies can be purified by heating the graphite bodies to a high temperature in the presence of a certain type or class of chlorinated hydrocarbon so that the decomposition products of such reagents are in intimate contact with and diffuse into the graphite.

The main object of this invention is to provide a simple and economical method of removing impurities, particularly vanadium, from graphite bodies by a process which does not require complicated procedures or apparatus, and does not require the handling of gaseous or highly volatile purifying agents at elevated temperatures.

The above object is accomplished by heating graphite articles in the presence of chlorinated hydrocarbon having a boiling point above 200° C. and which can be introduced into or placed around the graphite article at room temperature prior to the heating step, to a temperature sufficiently high to form and volatilize the chlorides of the metallic impurities. Preferably, this temperature will be at least 1000° C.

I have found that the process of this invention is suitable for the purification of graphite articles only and is not applicable to the purification of so-called gas-baked carbon. Apparently the vanadium impurities are combined in the baked-carbon bodies in a different or less reactive state than in the graphite.

In a broad embodiment this invention comprises a process for the removal of metallic carbide impurities, such as vanadium carbide from artificial graphite bodies in which a chlorinated hydrocarbon having a boiling point above 200° C. is either employed to impregnate the graphite article or is mixed with a solid carbonaceous carrier such as resistor coke which is then packed around the graphite article in an electric furnace in which the graphite articles are placed and heated to high temperatures. After the aforesaid preparation, the graphite articles are packed in the furnace in such a way as to exclude burning of the graphite and then the furnace is usually heated to a temperature of at least 1000° C. to effect purification.

In a preferred embodiment of my invention, the removal of the vanadium and other metal impurities by means of the reagents and methods disclosed herein is improved by employing either an inert gas such as nitrogen, argon, etc., or an alkaline earth metal chloride or an alkali metal chloride while the graphite articles are being heated with the reagent. These materials serve to "sweep" the vanadium and other metallic chlorides out of the reaction zone thereby reducing the length of time required for the purification.

In one specific embodiment of this invention, graphite articles are impregnated with about 1.8% by weight of Aroclor which is a trade mark for a chlorinated aromatic hydrocarbon obtained by chlorinating diphenyl or polyphenyls, usually until the chlorine content of the chlorinated hydrocarbon increases to 50% or more by weight. A wide variety of compositions of this general nature can be used, including the compositions and compounds set forth in the Encyclopedia of Chemical Technology (published by Interscience Encyclopedia, Inc., 1949), vol. 3, pages 826 to 831, particular reference being made to the table on page 827. When Aroclor is used, it is dissolved in a suitable solvent such as toluene or mineral spirits and the resulting solution used to impregnate the graphite articles so that the latter will contain about 1% or more of the Aroclor, on a solvent-free basis. The impregnated graphite articles are then heated, for example in an electric furnace in a stream of nitrogen gas, to a temperature of at least 1000° C., and preferably 1500° C. Analysis of the purified graphite indicates that the vanadium content is reduced from an initial value of 47 p.p.m. down to 1.9 p.p.m., and the total ash content is reduced from an initial amount of 0.08% down to 0.039%.

In another embodiment of the invention, graphite anodes are packed in an electrical resistance heating furnace with a mixture of calcined petroleum coke or metallurgical coke fines having distributed therein 8 to 9% by weight of powdered Aroclor, based on the weight of the graphite anodes. A suitable furnace for conducting this purification method is a commercial furnace used for graphitizing carbon electrodes as illustrated and discussed in Industrial Carbon by C. L. Mantell, Second Edition (D. Van Nostrand Company, Inc., 1946), in chapters XIII and XVI. After packing the furnace, the power is turned on and the "pack" is heated to 1500° C. The vanadium content of the anodes is reduced from an initial 57 p.p.m. down to about 7 p.p.m.

In a further embodiment of this invention, graphite anodes are impregnated with 5.4% by weight of Aroclor (65% chlorine) dissolved in mineral spirits and the solvent-free specimens are heated to a temperature of 2500° C. in a tube furnace with a nitrogen sweep gas. The vanadium content of the graphite articles is reduced from an initial 54.5 p.p.m. down to about 4.0 p.p.m.

Any chlorinated hydrocarbon having a boiling point of at least 200° C. is suitable for use as the purifying agent in accordance with this invention. Particularly suitable materials are the Aroclor materials previously referred to herein, and chlorinated paraffin wax containing 30 to 70% chlorine, for example the composition available in industry under the trademark Chlorowax manufactured by the Diamond Alkali Company and discussed in the Encyclopedia of Chemical Technology, vol. 3, page 782. The compositions available in the trade under the trademark Halowax are also useful for the practice of this invention. These compositions are mixtures of chlorinated naphthalenes manufactured by Union Carbide Corporation, and are discussed in vol. 3, page 836, of the Encyclopedia of Chemical Technology. In addition to the foregoing compositions, the tarry chlorine-containing residues obtained from manufacturing the previously mentioned compositions can be used as reagents in the process of this invention. The tarry residue obtained from the manufacture of Aroclor is marketed under the trademark Montar and this, when admixed with resistor coke, is particularly suitable as a reagent for purifying graphite anodes in an electric resistance furnace.

In addition to the above-mentioned chlorinated compositions, the following are also suitable for conducting the process of this invention:

TABLE I

| | Boiling Point, °C. | Melting Point, °C. |
|---|---|---|
| Chloro-diphenyl (o) | 267–8 | 34 |
| Chloro-diphenyl (p) | 282 | 75–6 |
| Chloro-naphthalene (a) | 259.3 | |
| Chloro-naphthalene (b) | 264.6 (751 mm.) | 56–7 |
| Dichloro-diphenyl (3,3') | 322–4 | 23 |
| Dichloro-dephenyl (4,4') | 315–9 | 148 |
| Dichloro-naphthalene (1,2) | 282 | 37 |
| Dichloro-naphthalene (1,3) | 291 (775 mm.) | 61.5 |
| Dichloro-naphthalene (1,4) | 286–7 (740 mm.) | 67.8 |
| Dichloro-naphthalene (1,7) | 285–6 | 63–4 |
| Dichloro-naphthalene (2,6) | 285 | 135–6 |
| Trichloro-benzene (1,2,3) | 218–9 | 52–3 |
| Trichloro-benzene (1,2,4) | 213 | 17 |
| Trichloro-benzene (1,3,5) | 208.5 (764 mm.) | 63.5 |
| Tetrachloro-benzene (1,2,3,4) | 254 (761 mm.) | 46–7 |
| Tetrachloro-benzene (1,2,3,5) | 246 | 54–5 |
| Tetrachloro-benzene (1,2,4,5) | 240–6 | 138–40 |
| Penta-chlorobenzene $Cl_5C_6H$ | 275–7 | 85–6 |
| Penta-chloro-cosane $C_{25}H_{52}Cl_5$ | 282–4 (40 mm.) | 53–3 |
| Pentachloro-Decane | 270.5 | 10 |
| Pentachloro-Ethylbenzene | 277 | –20 |
| Pentachloro-Methylbenzene | 230–1 | 53 |
| Hexachloro-Ethane | 262 (15 mm.) | 56.6 |
| Hexachloro-benzene | 185.5/176.7 | 186.9–7.4 |

I have found that purification of graphite bodies with the reagents disclosed herein will best occur at temperatures above 1000° C., preferably with a reagent concentration of about 1.0% or greater by weight of the graphite material to be purified.

The term "a chlorinated hydrocarbon" as used herein and in the appended claims also includes mixtures of the materials or reagents described herein.

In a further embodiment of the invention, graphite anodes (20" x 13" x 3¼") used in a Solvay Type V-cell for the electrolysis of sodium chloride brine were placed in a commercial electric resistance furnace of the type previously referred to herein, using a calcined petroleum coke of low vanadium content as the resistor material, and the furnace was suitably insulated. About 5% by weight of powdered Aroclor (65% chlorine) and 2% by weight of powdered calcium chloride were admixed with the resistor coke prior to loading of the furnace. Both concentrations of reagents refer to percent by weight of the graphite anodes. Alternatively, the reagents may be mixed with the resistor coke while the latter is packed around the graphite anodes. Power was applied to the head electrodes of the furnace and the temperature of the pack was brought up to about 2200° C. The vanadium content of the purified anodes is usually found to be less than 2 p.p.m.

In a further embodiment of the invention an alkali metal chloride or an alkaline earth metal chloride such as sodium chloride or calcium chloride, respectively, is dissolved in a suitable solvent and the solution is used as an impregnating agent for the graphite bodies. The concentration of the solute and the amount introduced into the pores of the graphite is so controlled that, after drying the bodies to remove the solvent, a residual quantity of the inorganic reagent in an amount between about 2% to 5% by weight (based on the graphite) remains in the graphite body. The resulting graphite bodies can then be impregnated with a solution of chlorinated hydrocarbon of the type herein described and heated in a furnace to remove metallic impurities, particularly metallic carbide impurities, either in the presence of a stream of inert gas or by packing the impregnated carbon bodies in resistor coke and heating the packed bodies to the temperatures specified herein. This technique is particularly useful when it is desired to purify graphite articles having a large cross section.

The purifying reagents disclosed herein can be employed by several methods. A preferred method is to blend the reagents with the resistor coke used in an electrical resistance furnace prior to loading of the resistor into the furnace. Numerous alternate methods can be used such as distributing incremental amounts in the furnace pack in alternate layers of resistor material and reagent; impregnating the graphite stock with liquid or molten reagent and dispersing the inorganic chloride in the resistor coke; coating or impregnating the resistor coke with reagent; or distributing appropriate quantities of reagents in between the cavities formed by special packing agents for the graphite bodies.

The process of this invention is more specifically illustrated by the following examples.

*Example I*

Samples of graphite (1¼" x 6¼" x 3") were impregnated with a 30% solution of Aroclor in toluene. The samples were air dried and were found to contain about 4 to 5% Aroclor. The samples were placed in graphite containers and packed with resistor coke. The containers were then placed in a tube furnace and heated to various final temperatures using a nitrogen sweep gas. The results are summarized in Table II.

TABLE II

| Sample No. | Final Temp., °C. | Percent Aroclor | Percent Ash [1] | p.p.m. V |
|---|---|---|---|---|
| 1 | 0 | 0 | 0.105 | 54.5 |
| 2 | 600 | 4.6 | 0.090 | 33.4 |
| 3 | 1,000 | 5.5 | 0.068 | 2.9 |
| 4 | 1,500 | 5.8 | 0.040 | 3.3 |
| 5 | 2,500 | 5.4 | 0.017 | 4.0 |

[1] At 650° C., oxygen atmosphere.

The above data show that the removal of vanadium from graphite has a threshold temperature of about 1000° C.

*Example II*

A blend of 8.4% Aroclor (by weight of the graphite stock) and calcined petroleum coke was packed around graphite anodes in a suitable container. The container was heated in a tube furnace at the rate of 750° C. per hour to a final temperature of 1500° C. The purified graphite anodes had a vanadium content of 7.2 p.p.m. If a nitrogen sweep gas or alkali metal chloride such as sodium or potassium chloride or alkaline earth metal chloride such as calcium or magnesium chloride is used, the vanadium content of the purified graphite anodes is reduced to less than 2 p.p.m.

*Example III*

A layer of thermatomic carbon (as defined in U.S. Patent 2,527,595) was packed in the bottom of an electrical resistance furnace of the type described in the Mantell reference previously referred to herein, to form an insulation bed and to act as a support for graphite anodes to be purified. A 6″ bed of resistor coke having a low vanadium content was used as an electric current conductor at each end of the furnace and a 1.5″ layer of calcined petroleum coke resistor was placed on top of the thermatomic carbon. Graphite anodes (20″ x 12½″ x 3¼″)

containing 65 p.p.m. of vanadium were placed on the layer of petroleum coke leaving a 1″ space between the anodes. The spaces between the anodes were filled with calcined petroleum coke and finely divided calcium chloride (2% by weight of the anodes). Graphite flour (50% minus 200 mesh) was then dispersed over the surface of the anodes to provide a better electrical joint between the anodes. The next row of anodes was placed on the bottom row and 4% by weight of Aroclor was placed in the spaces between the anodes. Over the anodes was placed a layer of the petroleum coke resistor material with Aroclor dispersed therein to bring the final quantity of Aroclor up to 5% by weight of the graphite anodes. Thermatomic carbon insulation was used between the exterior furnace walls and the "furnace pack" and as a cover on the furnace. The furnace was heated to a final temperature of 2250° C. over a period of five hours. The vanadium content of the anodes was reduced to 0.2 p.p.m.

While the foregoing specific examples discuss only the use of Aroclor reagent, it is to be understood that the other chlorinated hydrocrabon reagents disclosed herein are equally suitable for the purpose intended. Also, any alkali metal or alkaline earth metal halide can be used to assist in the removal of the vanadium and other metal chlorides which are produced by reason of the action of the chlorinated hydrocarbon reagent on these metallic impurities.

Having thus described and exemplified my invention, but intending to be limited only by the scope of the appended claim, I claim:

1. A process for purifying artificial graphite bodies containing metallic carbide impurities including vanadium carbide comprising packing said bodies in coke particles and a chlorinated hydrocarbon having a boiling point above about 200° C. and then heating the packed bodies to a temperature sufficiently high to impregnate said graphite bodies with the chlorinated hydrocarbon and form and volatilize chlorides of said impurities.

2. A process for purifying artificial graphite bodies containing metallic carbide impurities including vanadium carbide comprising packing said bodies in coke particles and a chlorinated hydrocarbon having a boiling point above about 200° C. and at least one agent of the group consisting of alkali metal chloride, alkaline earth metal chloride and mixtures thereof, and then heating the packed graphite bodies to a temperature sufficiently high to impregnate said graphite bodies with the chlorinated hydrocarbon and form and volatilize chlorides of said impurities.

3. A process according to claim 2 wherein the chlorinated hydrocarbon is a chlorinated biphenyl composition and the alkaline earth metal chloride is calcium chloride.

4. A process according to claim 3 wherein the coke particles, the chlorinated biphenyl composition and the calcium chloride are mixed together prior to packing around the graphite bodies.

5. A process according to claim 3 wherein the graphite bodies are packed by alternately adding the coke particles, the chlorinated biphenyl composition and the calcium chloride.

6. A process for purifying artificial graphite bodies containing metallic carbide impurities including vanadium carbide comprising impregnating said bodes with at least one agent of the group consisting of alkali metal chloride, alkaline earth metal chloride and mixtures thereof, and then heating the impregnated bodies in a bed of coke particles and a chlorinated hydrocarbon having a boiling point above about 200° C. to a temperature sufficiently high to impregnate said graphite bodies with the chlorinated hydrocarbon and form and volatilize chlorides of said impurities.

7. A process according to claim 6 wherein the impregnant is a chlorinated biphenyl compound.

8. A process for purifying artificial graphite bodies containing metallic carbide impurities including vanadium carbde comprising impregnating said bodies with at least one agent of the group consisting of alkali metal chloride, alkaline earth metal chloride and mixtures thereof, and also impregnating said bodies with a chlorinated hydrocarbon having a boiling point above 200° C., packing the impregnated bodies in a bed of coke particles and then heating the packed bodies to a temperature sufficiently high to form and volatilize chlorides of said impurities.

References Cited in the file of this patent

UNITED STATES PATENTS

| | | |
|---|---|---|
| 1,303,362 | Mott | May 13, 1919 |
| 2,260,746 | Hanawalt et al. | Oct. 28, 1941 |
| 2,315,346 | Mitchell | Mar. 30, 1943 |
| 2,734,800 | Brooks | Feb. 14, 1956 |
| 2,914,383 | Ulrich | Nov. 24, 1959 |

FOREIGN PATENTS

| | | |
|---|---|---|
| 748,018 | Great Britain | Apr. 18, 1956 |